US012240463B2

(12) United States Patent
Tsukamoto

(10) Patent No.: US 12,240,463 B2
(45) Date of Patent: Mar. 4, 2025

(54) APPARATUS, METHOD, AND COMPUTER PROGRAM FOR GENERATING MAP

(71) Applicant: TOYOTA JIDOSHA KABUSHIKI KAISHA, Toyota (JP)

(72) Inventor: Mamoru Tsukamoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/570,945

(22) Filed: Jan. 7, 2022

(65) Prior Publication Data
US 2022/0219700 A1 Jul. 14, 2022

(30) Foreign Application Priority Data

Jan. 12, 2021 (JP) ................................ 2021-002733

(51) Int. Cl.
*B60W 30/18* (2012.01)
*B60W 60/00* (2020.01)
*G06V 20/56* (2022.01)

(52) U.S. Cl.
CPC .. *B60W 30/18159* (2020.02); *B60W 60/0011* (2020.02); *B60W 60/0025* (2020.02); *G06V 20/588* (2022.01); *B60W 2420/403* (2013.01); *B60W 2552/10* (2020.02); *B60W 2552/53* (2020.02)

(58) Field of Classification Search
CPC ....... B60W 30/18159; B60W 60/0011; B60W 60/0025; B60W 2420/42; B60W 2552/10; B60W 2552/53; G06V 20/588
See application file for complete search history.

(56) References Cited

U.S. PATENT DOCUMENTS

| | | | | |
|---|---|---|---|---|
| 2017/0154528 | A1* | 6/2017 | Moritani | G06V 20/597 |
| 2019/0086928 | A1 | 3/2019 | Chen et al. | |
| 2020/0109953 | A1* | 4/2020 | Hokai | G06F 16/29 |
| 2020/0278210 | A1 | 9/2020 | Nomura | |
| 2020/0290643 | A1* | 9/2020 | Ueda | B60W 50/10 |
| 2020/0364898 | A1* | 11/2020 | Lawlor | G06T 7/74 |

(Continued)

FOREIGN PATENT DOCUMENTS

| | | |
|---|---|---|
| JP | 2017-054346 A | 3/2017 |
| JP | 2018-173512 A | 11/2018 |

(Continued)

*Primary Examiner* — Behrang Badii
*Assistant Examiner* — Harrison Heflin
(74) *Attorney, Agent, or Firm* — Sughrue Mion, PLLC

(57) ABSTRACT

An apparatus for generating a map includes a processor configured to: detect an intersection and roads connected to the intersection from a bird's-eye view image, detect, for each road, an entry lane for entering the intersection and an exit lane for exiting the intersection included in the road, detect, for each road, a road marking represented in the road or a road structure from the bird's-eye view image, the road marking and the road structure indicating a direction in which vehicles are allowed to proceed, and generate a lane network representing a connection relationship between lanes in the intersection so as to connect, for each road, an entry lane of the road to an exit lane of another of the roads to which vehicles are allowed to proceed from the entry lane of the road, based on the road marking marked on the entry lane or the structure.

8 Claims, 7 Drawing Sheets

(56) References Cited

U.S. PATENT DOCUMENTS

| | | | | |
|---|---|---|---|---|
| 2021/0182575 A1* | 6/2021 | Murakami | ............ | G06V 20/588 |
| 2021/0279482 A1* | 9/2021 | Choi | ................... | B60W 40/105 |
| 2021/0342586 A1* | 11/2021 | Fleisig | ................. | G06V 10/457 |

FOREIGN PATENT DOCUMENTS

| | | |
|---|---|---|
| JP | 2019-101256 A | 6/2019 |
| JP | 2020-038365 A | 3/2020 |

\* cited by examiner

APPARATUS, METHOD, AND COMPUTER PROGRAM FOR GENERATING MAP

FIELD

The present invention relates to an apparatus, a method, and a computer program for generating a map from an image.

BACKGROUND

Techniques have been proposed to generate a map including information used for automatically driving a vehicle from an image representing roads (see Japanese Unexamined Patent Publications Nos. 2017-54346 and 2020-38365). A device for generating road data disclosed in Japanese Unexamined Patent Publication No. 2017-54346 extracts a road-surface-high flat region of a height of a road on the ground and extracts, as a road region seed, a center line of the region remaining after excluding a region wider than a preset upper-limit road width from the road-surface-high flat region. The device generates a road region by region growing from the road region seed, using height information obtained from a digital surface model (DSM) and spectrum information obtained from an aerial photographic image. A device for generating travel trajectory data in an intersection disclosed in Japanese Unexamined Patent Publication No. 2020-38365 recognizes a road marking in the intersection, using captured image data of the intersection, and generates, in response to the result of recognition, travel trajectory data that enables specification of a travel trajectory for autonomous driving in the intersection.

SUMMARY

As a piece of information used for automatically driving a vehicle, a map includes information indicating the connection relationship between lanes, which is referred to for setting a planned trajectory of a vehicle under automated driving control. To generate a map, it is desirable to obtain information indicating the connection relationship between lanes on which vehicles are allowed to travel, regarding an intersection in particular, in roads connected to the intersection.

It is an object of the present invention to provide an apparatus for generating a map that can automatically extract the connection relationship between lanes on which vehicles are allowed to travel in roads connected to an intersection, based on a bird's-eye view image.

As an aspect of the present invention, an apparatus for generating a map is provided. The apparatus includes a processor configured to: detect an intersection and roads connected to the intersection from a bird's-eye view image, detect, for each of the roads connected to the intersection, an entry lane for entering the intersection and an exit lane for exiting the intersection included in the road, and detect, for each of the roads, a road marking represented in the road or a road structure from the bird's-eye view image, the road marking and the road structure indicating a direction in which vehicles are allowed to proceed. The processor is further configured to generate a lane network representing a connection relationship between lanes in the intersection so as to connect, for each of the roads, an entry lane of the road to an exit lane of another of the roads to which vehicles are allowed to proceed from the entry lane of the road, based on the road marking marked on the entry lane of the road or the structure of the road.

The processor of the apparatus preferably detects, as the road marking, an arrow indicating a direction in which vehicles are allowed to proceed; and the processor preferably generates the lane network so as to connect, for each of the roads, an entry lane of the road only to an exit lane of another of the roads lying in the direction indicated by the arrow marked on the entry lane of the road.

Alternatively, the processor of the apparatus preferably detects, as the road structure, a bypass route connecting an entry lane of one of the roads connected to the intersection directly to an exit lane of another of the roads; and the processor preferably generates the lane network so as to connect the entry lane and the exit lane connected by the bypass route.

As another aspect, a method for generating a map is provided. The method includes detecting an intersection and roads connected to the intersection from a bird's-eye view image; detecting, for each of the roads connected to the intersection, an entry lane for entering the intersection and an exit lane for exiting the intersection included in the road; and detecting, for each of the roads, a road marking represented in the road or a road structure from the bird's-eye view image, the road marking and the road structure indicating a direction in which vehicles are allowed to proceed. The method further includes generating a lane network representing a connection relationship between lanes in the intersection so as to connect, for each of the roads, an entry lane of the road to an exit lane of another of the roads to which vehicles are allowed to proceed from the entry lane of the road, based on the road marking marked on the entry lane of the road or the structure of the road.

As still another aspect, a non-transitory recording medium that stores a computer program for generating a map is provided. The computer program includes instructions causing a computer to execute a process including detecting an intersection and roads connected to the intersection from a bird's-eye view image; detecting, for each of the roads connected to the intersection, an entry lane for entering the intersection and an exit lane for exiting the intersection included in the road; and detecting, for each of the roads, a road marking represented in the road or a road structure from the bird's-eye view image, the road marking and the road structure indicating a direction in which vehicles are allowed to proceed. The process further includes generating a lane network representing a connection relationship between lanes in the intersection so as to connect, for each of the roads, an entry lane of the road to an exit lane of another of the roads to which vehicles are allowed to proceed from the entry lane of the road, based on the road marking marked on the entry lane of the road or the structure of the road.

The apparatus according to the present invention has an advantageous effect of being able to automatically extract the connection relationship between lanes on which vehicles are allowed to travel in roads connected to an intersection, based on a bird's-eye view image.

DESCRIPTION OF EMBODIMENTS

Hereinafter, an apparatus for generating a map as well as a method and a computer program therefor used by the apparatus will be described with reference to the drawings. The apparatus detects an intersection area including an intersection and roads connected to the intersection from a bird's-eye view image representing roads. The apparatus also detects an entry lane for entering the intersection and an exit lane for exiting the intersection for each of the roads connected to the intersection. Then, the apparatus generates a lane network representing the connection relationship between lanes in the intersection so as to connect, for each of the roads connected to the intersection, an entry lane of the road to an exit lane of another of the roads to which vehicles are allowed to proceed from the entry lane of the road. To this end, for each of the roads connected to the intersection, the apparatus detects from the bird's-eye view image a road marking represented in an entry lane of the road and indicating a direction in which vehicles are allowed to proceed, and generates the lane network so as to connect the entry lane to an exit lane of another road to which vehicles are allowed to proceed from the entry lane, according to the direction indicated by the road marking.

In the embodiment or modified example described below, a bird's-eye view image representing roads that is a target for a map generation process may be, for example, an image of the ground taken vertically downward from above and identifiably representing individual road markings on the roads, e.g., an image representing a high-resolution satellite or aerial photograph. In the following description, a target bird's-eye view image for the map generation process may be simply referred to as an image.

Figure 1:
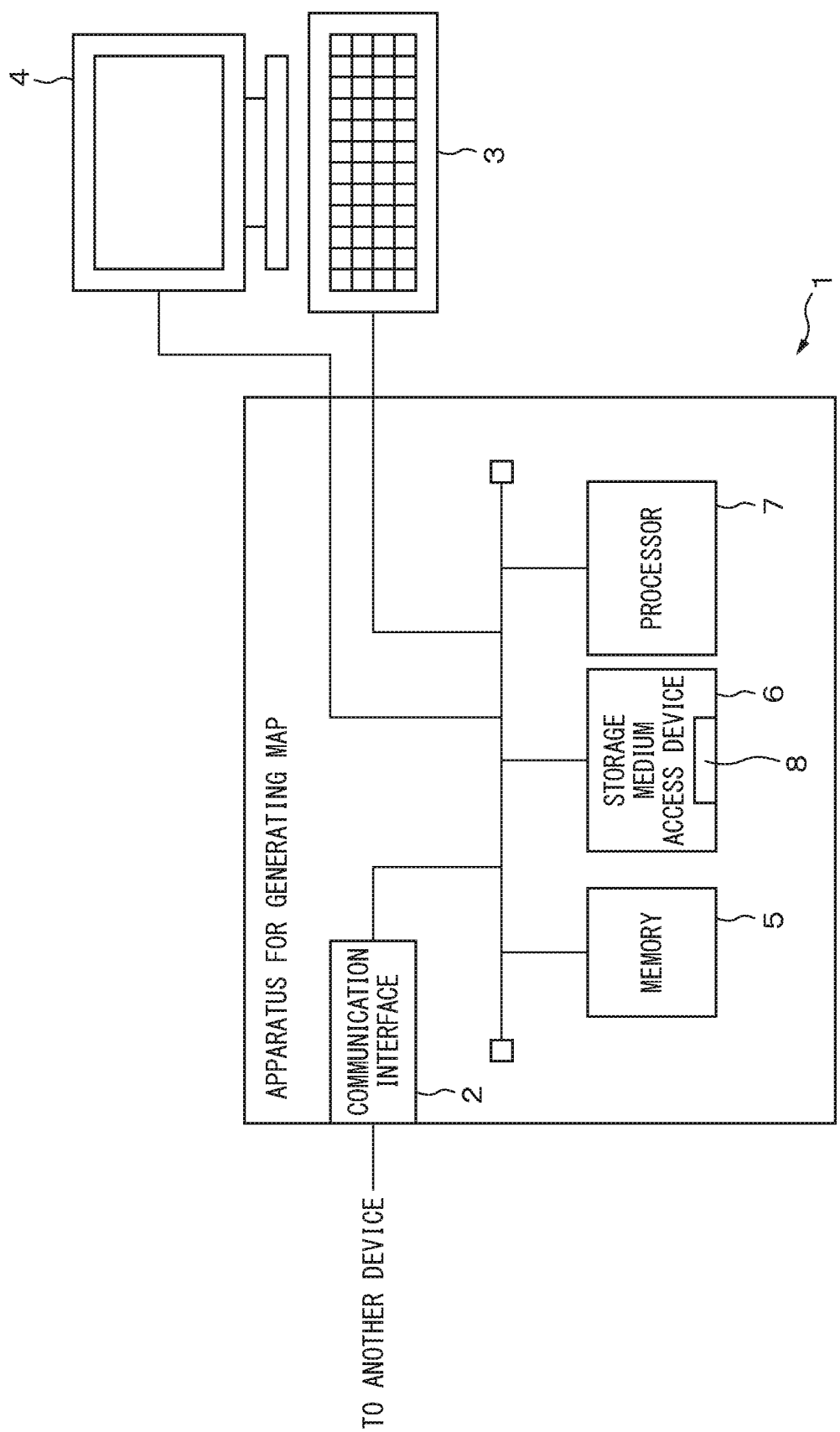
FIG. 1 illustrates the hardware configuration of an apparatus for generating a map according to an embodiment.

FIG. 1 illustrates the hardware configuration of an apparatus for generating a map according to an embodiment. As illustrated in FIG. 1, an apparatus 1 for generating a map includes a communication interface 2, an input device 3, a display 4, a memory 5, a storage medium access device 6, and a processor 7.

The communication interface 2 includes a communication interface and a control circuit thereof that are compliant with a communication standard, such as Ethernet (registered trademark), and used for connection to a communication network. The communication interface 2 receives various types of information or data from another device (not illustrated) connected via the communication network, and passes them to the processor 7. The data that the communication interface 2 receives may include an image representing roads that is a target for the map generation process, and information indicating the geographical area represented in the image, such as the latitude and longitude of a predetermined position in the region represented in the image (e.g., its upper left end or center), the real-space horizontal and vertical sizes of this region, and a bearing. The communication interface 2 may output a road map received from the processor 7, which is an example of map information obtained by executing the map generation process, to another device via the communication network.

The input device 3 includes, for example, a keyboard and a pointing device, such as a mouse. The input device 3 generates an operation signal in response to an operation by a user, such as an operation for selecting a target image of the map generation process, for giving instructions to start execution of the map generation process, or for causing a generated road map to appear on the display 4, and outputs the operation signal to the processor 7.

The display 4 includes, for example, a liquid crystal display or an organic electroluminescent display. The display 4 displays data for display received from the processor 7, such as data representing candidates for an image to be subjected to the map generation process, or a generated road map or a portion thereof.

The input device 3 and the display 4 may be integrated into a single device like a touch screen display.

The memory 5, which is an example of a storage unit, is composed of, for example, a readable-writable semiconductor memory and a read-only semiconductor memory. The memory 5 stores, for example, a computer program for the map generation process executed by the processor 7, various types of data used in this process, such as a set of parameters for specifying a classifier used in the map generation process, and various types of data generated during execution of this process. The memory 5 may further store a target image for the map generation process and information indicating the geographical area represented in the image. The memory 5 may further store a generated road map.

The storage medium access device 6 accesses a storage medium 8, such as a magnetic disk, a semiconductor memory card, and an optical storage medium. The storage medium access device 6 together with the storage medium 8 constitutes another example of a storage unit. The storage medium access device 6 reads data stored in the storage medium 8, such as a computer program for the map generation process to be executed on the processor 7 or a target image for the map generation process, and passes it to the processor 7. Alternatively, the storage medium access device 6 may receive a generated road map from the processor 7, and write the road map to the storage medium 8.

The processor 7, which is an example of a processing unit, includes, for example, one or more CPUs and a peripheral circuit thereof. The processor 7 may further include arithmetic circuits for numerical operation, graphics processing, and logical operation. The processor 7 controls the overall operation of the apparatus 1, and executes the map generation process on a target image representing roads.

Figure 2:
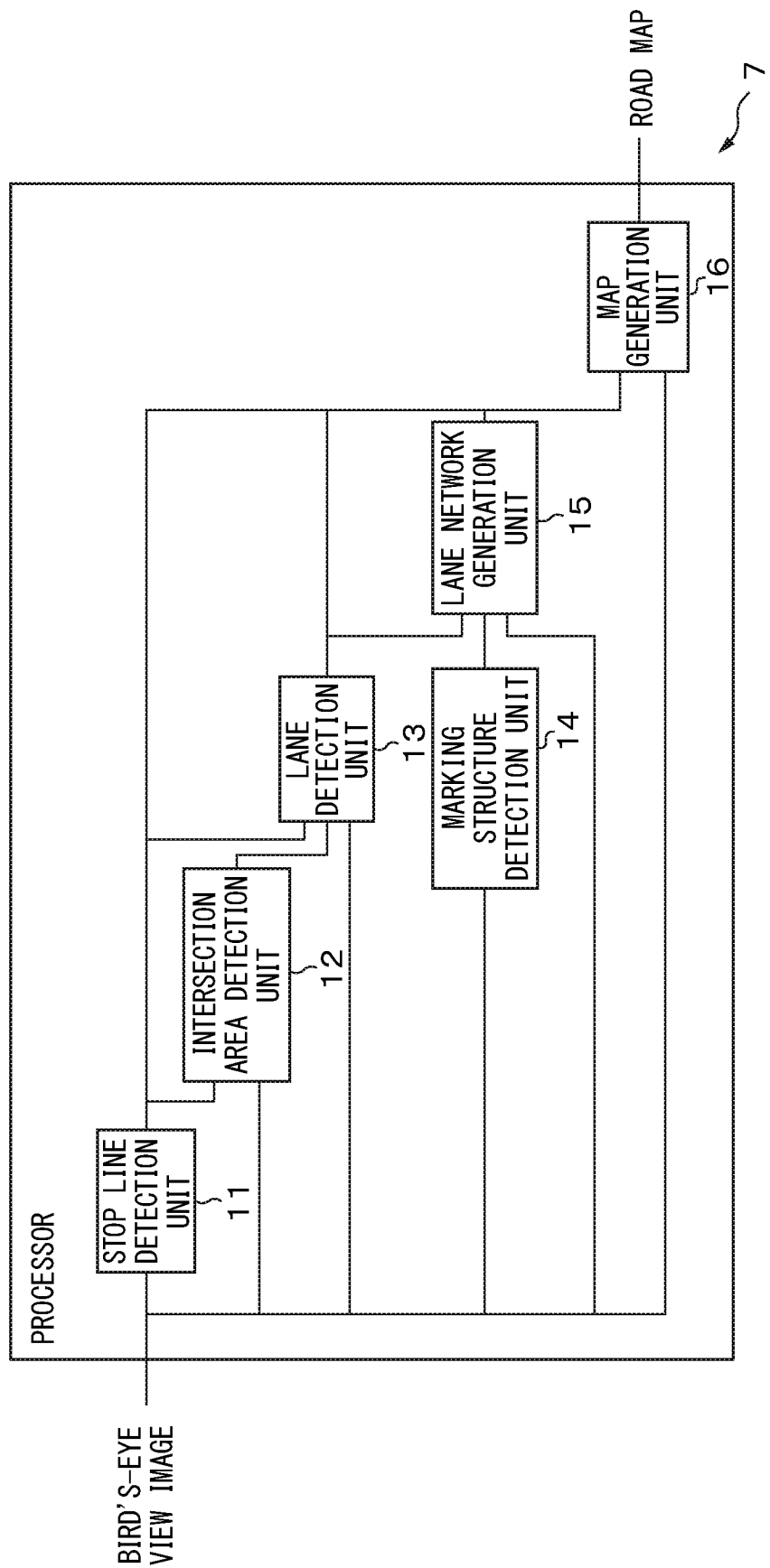
FIG. 2 is a functional block diagram of a processor of the apparatus for generating a map according to an embodiment.

FIG. 2 is a functional block diagram of the processor 7, related to the map generation process. As illustrated in FIG. 2, the processor 7 includes a stop line detection unit 11, an intersection area detection unit 12, a lane detection unit 13, a marking structure detection unit 14, a lane network generation unit 15, and a map generation unit 16. These units included in the processor 7 are, for example, functional modules implemented by a computer program executed on the processor 7, or may be dedicated arithmetic circuits provided in the processor 7.

The stop line detection unit 11 detects individual stop lines represented in an image. To achieve this, for example, the stop line detection unit 11 inputs the image into a classifier that has been trained to detect stop lines from an image, thereby detecting individual stop lines. As such a classifier, the stop line detection unit 11 may use, for example, a "deep neural network" (DNN) having a convolutional neural network (CNN) architecture. More specifically, such a classifier may be, for example, a CNN for semantic segmentation, e.g., a fully convolutional network (FCN), U-Net, or PSPNet, or a CNN for instance segmentation, e.g., Mask-RCNN. Alternatively, such a classifier may be a CNN for object detection, e.g., Single Shot MultiBox Detector (SSD) or Faster R-CNN. Additionally, such a classifier may be one conforming to a machine learning technique other than a neural network, e.g., AdaBoost. Alternatively, the stop line detection unit 11 may detect stop lines in accordance with a technique other than machine learning, such as template matching.

The stop line detection unit 11 notifies information indicating the positions and sizes of the detected individual stop lines in the image to the intersection area detection unit 12, the lane detection unit 13, and the map generation unit 16.

The intersection area detection unit 12, which is an example of the intersection detection unit, detects, for each intersection represented in the image, a predetermined area including the intersection and roads connected to the intersection (hereafter simply an "intersection area"). To achieve this, for example, the intersection area detection unit 12 inputs the image into a classifier that has been trained to detect a road marking indicating the center of an intersection (hereafter, an "intersection mark") and road areas representing roads from an image, thereby detecting individual intersection marks and road areas. As such a classifier, the intersection area detection unit 12 may use a classifier similar to that described in relation to the stop line detection unit 11, e.g., a CNN for semantic segmentation or instance segmentation. When a CNN for semantic segmentation is used as the classifier, the intersection area detection unit 12 may apply a clustering process or a labeling process to a set of pixels representing intersection marks to classify the set of pixels into individual intersection marks. The classifier used by the stop line detection unit 11 may be trained in advance to detect not only stop lines but also intersection marks and road areas from an image. In this case, the intersection area detection unit 12 receives information indicating the positions and sizes of intersection marks and road areas in the image together with information indicating those of stop lines from the stop line detection unit 11.

Upon detection of intersection marks and road areas, the intersection area detection unit 12 detects an intersection area for each detected intersection mark in accordance with the following procedure.

The intersection area detection unit 12 sets a reference point in the intersection at a predetermined point in the detected intersection mark in the image, e.g., at the centroid position of the intersection mark. The intersection area detection unit 12 then sets scan lines drawn radially from the reference point at equiangular intervals, and detects, for each scan line, the position where the scan line crosses a border between a road area and another region (hereafter, a "road edge") or an extension of a stop line to a road edge, as an outer edge of the intersection area. Determining outer edges of the intersection area in this way results in the intersection area including stop lines of roads connected to the intersection, facilitating determination of the number of lanes included in each road connected thereto.

Regarding a scan line that does not cross a stop line nor a line like that described above between the reference point of the intersection and a preset farthest end, the intersection area detection unit 12 detects the position of the farthest end as a candidate for an outer edge of the intersection area. In a road where the position of the farthest end is a candidate for an outer edge, the intersection area detection unit 12 gradually brings an outer-edge candidate line on which candidates for the outer edge align nearer to the reference point. Then, when the length of the outer-edge candidate line becomes longer than the immediately preceding length thereof at a predetermined ratio or more, it sets the outer edge of the intersection area on a line farther from the reference point than this outer-edge candidate line by a predetermined number of pixels. In this way, the intersection area detection unit 12 can include in the intersection area a portion where a road having no stop line is connected to the intersection. This allows for appropriately setting a lane network related to the road having no stop line.

The intersection area detection unit 12 detects an area surrounded by a line connecting the outer edges set on the roads connected to the intersection as the intersection area.

Figure 3A:
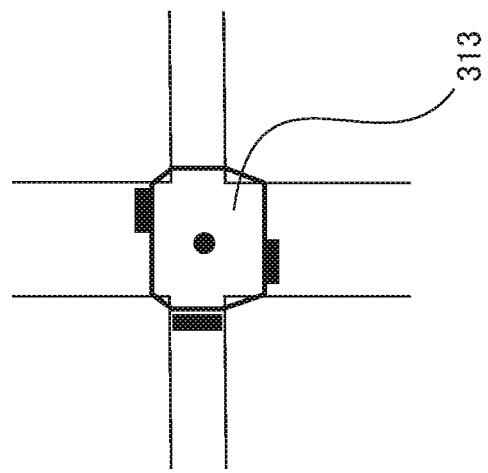
FIG. 3A is a diagram for briefly explaining detection of an intersection area.
Figure 3B:
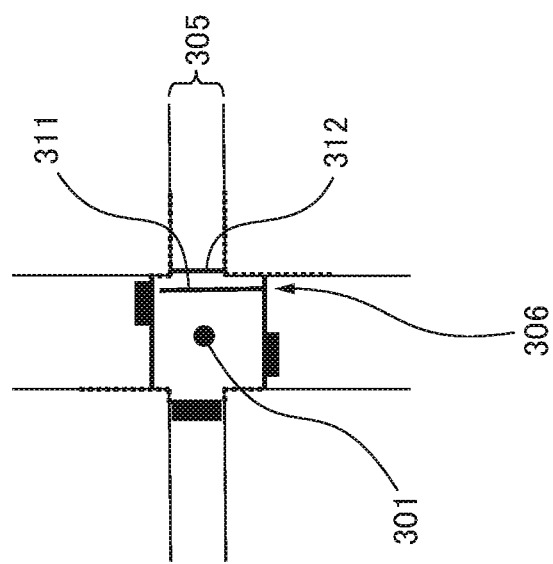
FIG. 3B is a diagram for briefly explaining detection of an intersection area.
Figure 3C:
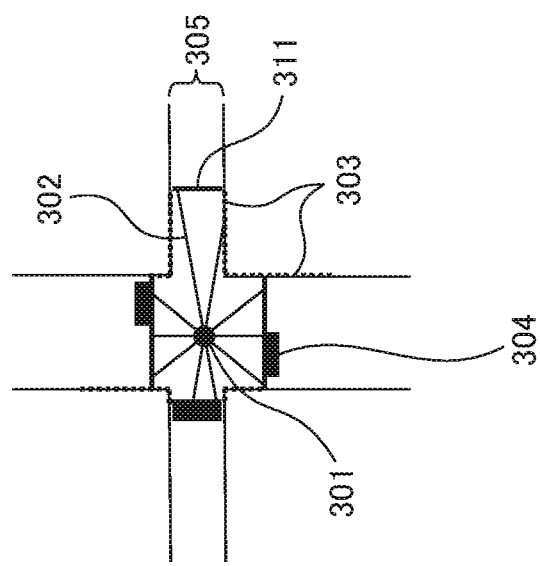
FIG. 3C is a diagram for briefly explaining detection of an intersection area.

FIGS. 3A to 3C are diagrams for briefly explaining detection of an intersection area. As illustrated in FIG. 3A, for each scan line 302 set radially from a reference point 301 in an intersection, the position where the scan line 302 crosses a road edge 303 or an extension of a stop line 304 to a road edge 303 is set as an outer edge of an intersection area. However, in a road 305 on the right of the reference point 301, an outer-edge candidate line 311 of the intersection area is set at the position of a preset farthest end because it has no stop line.

As illustrated in FIG. 3B, when the outer-edge candidate line in the road 305 is gradually brought nearer to the reference point 301, at a position 306 the length of this line becomes longer at a predetermined ratio or more than the immediately preceding length thereof. Thus an outer-edge candidate line farther from the reference point 301 than the position 306 by a predetermined number of pixels is set in the road 305 as an outer edge 312 of the intersection area.

As illustrated in FIG. 3C, the area surrounded by outer edges set in the respective roads is an intersection area 313 in the end.

There is an intersection having no intersection mark. The intersection area detection unit 12 may set a reference point of an intersection having no intersection mark in accordance with the following procedure.

The intersection area detection unit 12 applies a skeletonizing process to road areas detected by a classifier to obtain a skeleton network representing the connection relationship between roads. This causes the roads to be represented by single lines, and thus an intersection becomes a node where lines cross. The intersection area detection unit 12 sets reference points at nodes of orders not less than three. Instead of skeletonizing road areas, the intersection area detection unit 12 may execute a thinning process on the road areas to obtain a thinned network representing the connection relationship between roads. In this case also, the intersection area detection unit 12 similarly sets reference points at nodes of orders not less than three. Based on such a network, the intersection area detection unit 12 can set a reference point in an intersection having no intersection mark, and thus appropriately set an intersection area for such an intersection.

Figure 4:
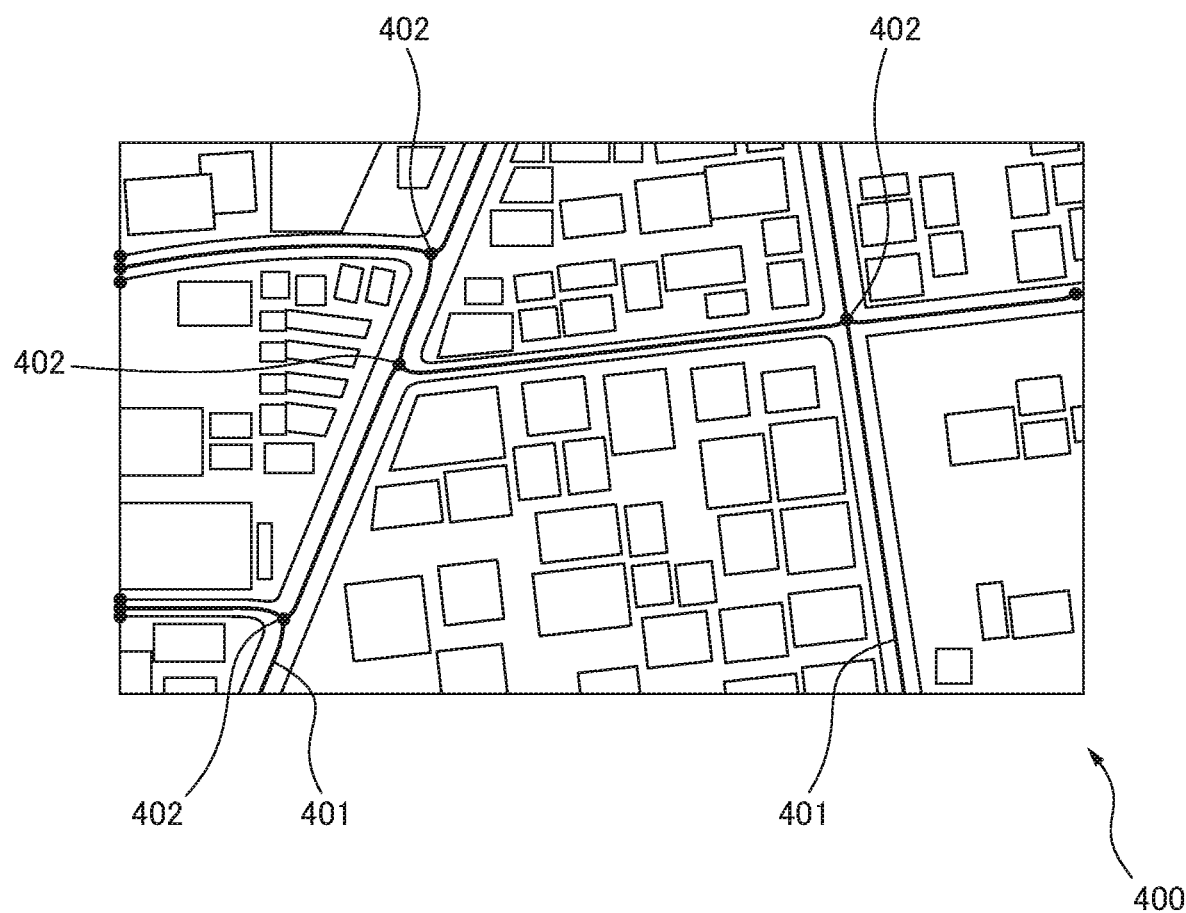
FIG. 4 is a diagram for briefly explaining detection of reference points of intersections by a skeletonizing or thinning process.

FIG. 4 is a diagram for briefly explaining detection of reference points of intersections by a skeletonizing or thinning process. As illustrated in FIG. 4, skeletonizing or thinning road areas represented in an image 400 yields a skeletonized or thinned network 401, in which nodes 402 of orders not less than three have appeared at individual intersections. This suggests that the nodes 402 can be set as reference points for detection of intersection areas.

Alternatively, the intersection area detection unit 12 may execute processing for creating a Voronoi tessellation on road areas with individual pixels representing road edges used as generators. In this case, Voronoi edges will be drawn close to the centers of respective roads, causing Voronoi points where Voronoi edges cross to appear at intersections. Thus the intersection area detection unit 12 may set reference points at the Voronoi points. In this case also, the intersection area detection unit 12 can set a reference point in an intersection having no intersection mark, and thus appropriately set an intersection area for such an intersection.

The intersection area detection unit 12 notifies information indicating detected individual intersection areas in the image to the lane detection unit 13, the lane network generation unit 15, and the map generation unit 16.

The lane detection unit 13 detects, for each road connected to the intersection included in an detected individual intersection area, at least one of an entry lane for entering the intersection and an exit lane for exiting the intersection.

For example, when the length of a stop line of a road of interest is not greater than the value of the road width multiplied by a predetermined factor (e.g., 0.5), the lane detection unit 13 determines that the road includes both an entry lane and an exit lane. When the length of a stop line is greater than the value of the road width multiplied by the predetermined factor, the lane detection unit 13 determines that the road includes only an entry lane. The lane detection unit 13 can calculate the width of the road of interest as the distance between road edges in a direction substantially perpendicular to the lengthwise direction of the road. When lane lines are detected by one of the classifiers described above, the lane detection unit 13 determines that there are as many lanes as the number of divisions by these lane lines, for both entry lanes and exit lanes of the road of interest. Regarding a road having stop lines, the lane detection unit 13 may determine the numbers of entry lanes and exit lanes, depending on the positional relationship between the lane lines and the stop lines. For example, the lane detection unit 13 determines the number of exit lanes by adding one to the number of lane lines on a road of interest which do not overlap any stop line on the road in a direction substantially perpendicular to the lengthwise direction of the road. The lane detection unit 13 also determines the number of entry lanes by adding one to the number of lane lines on the road of interest which overlap a stop line on the road in the substantially perpendicular direction. Additionally, the lane detection unit 13 may determine a lane line within a predetermined range of the end of a stop line, in the substantially perpendicular direction, closer to the center of the road of interest as one to distinguish between entry lanes and exit lanes, and exclude it from the count of the numbers of entry lanes and exit lanes. The predetermined range is set, for example, to a size smaller than the width of a vehicle in the image.

When a single lane line is detected in a road having no stop line, the lane detection unit 13 may determine that this road includes two lanes divided by this lane line. Of these two lanes, the lane detection unit 13 may determine that one along which vehicles are allowed to enter an intersection is an entry lane and the other is an exit lane, in accordance with the road law of the region represented in the image. Additionally, the lane detection unit 13 determines that a road where neither stop line nor lane line is detected (hereafter, referred to as a "lack-of-line road" for convenience of description) includes only an exit lane. Alternatively, the lane detection unit 13 may determine whether the lane of a lack-of-line road is an entry lane or an exit lane, based on the relationship between it and a lane included in another road connected to the same intersection. For example, the lane detection unit 13 determines that a lack-of-line road includes only an exit lane, when the intersection included in an intersection area of interest is a crossroads, the road opposite to the lack-of-line road with respect to a reference point has a stop line, and the opposite road includes only an entry lane. It may determine that the single lane included in a lack-of-line road of interest is one along which vehicles are allowed to enter and exit the intersection included in an intersection area of interest, i.e., an entry and exit lane, when the intersection of interest is a crossroads and the road opposite to the lack-of-line road of interest with respect to a reference point is also a lack-of-line road. In this way, the lane detection unit 13 can accurately detect entry lanes and exit lanes included in roads connected to an intersection, depending on the presence or absence of a stop line and the ratio of the length of the stop line to the road width.

For each intersection area, the lane detection unit 13 notifies the lane network generation unit 15 of information indicating entry lanes and exit lanes of each road connected to the intersection included in the intersection area.

The marking structure detection unit 14 detects, for each of the roads connected to an individual intersection, a road marking represented in the road and indicating a direction in which vehicles are allowed to proceed (hereafter, a "travel direction indicating mark") from the bird's-eye view image. To achieve this, for example, the marking structure detection unit 14 inputs the image into a classifier to detect individual travel direction indicating marks from the image and identify the types of the directions indicated by the detected travel direction indicating marks in which vehicles are allowed to proceed (e.g., arrows for indication of traveling straight, turning right, turning left, and traveling straight and turning left, which will be simply referred to as the types of travel direction indicating marks, below). The classifier is trained in advance to detect travel direction indicating marks from an image and identify their types. As such a classifier, the marking structure detection unit 14 may use a classifier for object detection similar to that described in relation to the stop line detection unit 11, e.g., a CNN for object detection, such as SSD or Faster R-CNN. Alternatively, the marking structure detection unit 14 may detect travel direction indicating marks and identify the types of the detected travel direction indicating marks in accordance with a technique other than machine learning, such as template matching of the image with templates prestored in the memory 5 for respective types of travel direction indicating marks.

The marking structure detection unit 14 passes to the lane network generation unit 15 information indicating the position of each detected individual travel direction indicating mark in the image (e.g., its centroid position or the positions of pixels of the upper left and lower right corners of a rectangular area surrounding the travel direction indicating mark) and the type of the travel direction indicating mark.

The lane network generation unit 15 generates, for each intersection area, a lane network representing the connection relationship between lanes in the intersection included in the intersection area so as to connect, for each of the roads connected to the intersection, an entry lane of the road to an exit lane of another of the roads connected to the intersection. In this way, information indicating directions in which vehicles are allowed to proceed on a lane-by-lane basis is obtained for each intersection.

In the present embodiment, the lane network generation unit 15 identifies, for each intersection area, an entry lane of a road connected to the intersection and an exit lane of another of the roads connected to the intersection to which vehicles are allowed to proceed from the entry lane of the road, based on a travel direction indicating mark on the entry lane of the road. Then, the lane network generation unit 15 generates the lane network so as to connect the entry lane of the road to the exit lane of another road to which vehicles are allowed to proceed from the entry lane.

To achieve this, for each detected travel direction indicating mark, the lane network generation unit 15 refers to information indicating the position of the travel direction indicating mark in the image and to the position of each intersection area in the image to identify the road and the entry lane having the travel direction indicating mark and the intersection area including the intersection connected with the road having the travel direction indicating mark. Additionally, the lane network generation unit 15 refers to the type of the travel direction indicating mark to identify the direction indicated by the travel direction indicating mark in which vehicles are allowed to proceed. Then, the lane network generation unit 15 identifies the exit lane of the road lying in the direction indicated by the travel direction indicating mark as viewed from the entry lane having the travel direction indicating mark as an exit lane connected with the entry lane, and connects the entry lane having the travel direction indicating mark to the identified exit lane.

Figure 5:
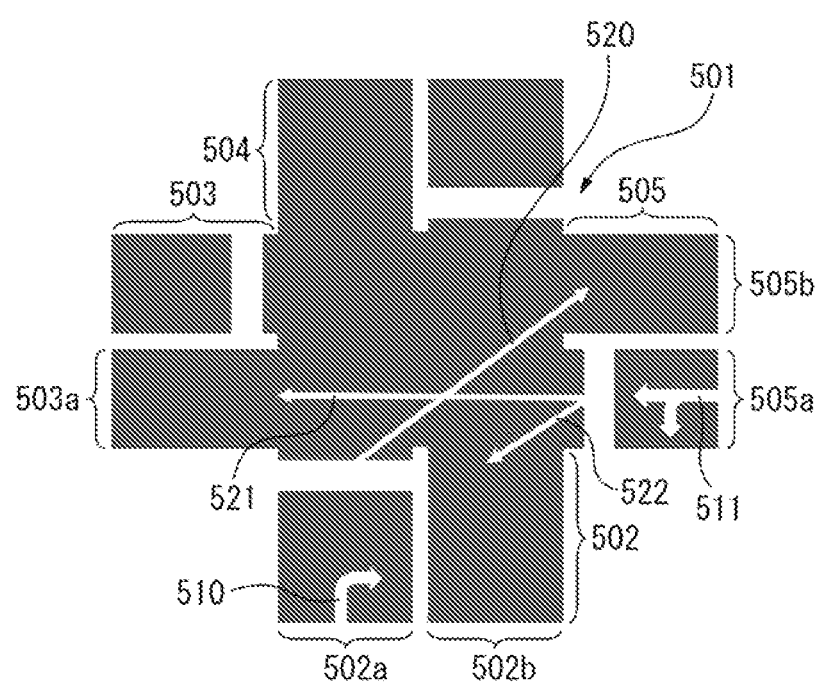
FIG. 5 illustrates an example of determination of the connection relationship between an entry lane and an exit lane, based on a travel direction indicating mark.

FIG. 5 illustrates an example of determination of the connection relationship between an entry lane and an exit lane, based on a travel direction indicating mark. As illustrated in FIG. 5, four roads 502 to 505 are connected to an intersection 501. Of these, on the entry lane 502a of the road 502 connected to the intersection 501 from the lower side is marked a travel direction indicating mark 510 indicating turning right. Thus, when generating a lane network, the lane network generation unit 15 connects the entry lane 502a of the road 502 to the exit lane 505b of the road 505, which lies, of the roads 503 to 505 other than the road 502, furthest to the right as viewed from the entry lane 502a, as indicated by a line 520.

When a travel direction indicating mark indicates more than one direction, the lane network generation unit 15 connects the entry lane of the road having the travel direction indicating mark to exit lanes of the roads lying in the directions indicated by the travel direction indicating mark as viewed from the entry lane.

With reference to FIG. 5 again, a travel direction indicating mark 511 indicating traveling straight and turning left is marked on the entry lane 505a of the road 505. Thus, when generating a lane network, the lane network generation unit 15 connects the entry lane 505a of the road 505 to the exit lane 503a of the road 503 and the exit lane 502b of the road 502, which lie, of the roads 502 to 504 other than the road 505, straight ahead and furthest to the left, respectively, as viewed from the entry lane 505a, as indicated by lines 521 and 522.

When no travel direction indicating mark is marked on an entry lane of a road connected to an intersection, the lane network generation unit 15 may generate a lane network so as to connect the entry lane to the exit lanes of the other roads connected to the intersection.

When a road connected to an intersection has more than one entry lane and each entry lane has a travel direction indicating mark thereon, the lane network generation unit 15 executes the above-described process for each entry lane. When the road lying in the direction indicated by a travel direction indicating mark on an entry lane of a road connected to an intersection has more than one exit lane, the lane network generation unit 15 generates a lane network so as to connect the entry lane to these exit lanes.

The lane network generation unit 15 may generate the lane network so as to connect, for each of entry lanes and exit lanes connected to each other, the midpoint of the entry lane in the widthwise direction, e.g., that of the stop line marked on the entry lane, to the midpoint of the exit lane in the widthwise direction. Additionally, the lane network generation unit 15 may connect entry lanes and exit lanes with curves so that vehicles can travel along the lane network.

The lane network generation unit 15 notifies the map generation unit 16 of information representing the lane network of each intersection area.

The map generation unit 16 generates a map including information representing the lane network of each intersection area. Additionally, for each road detected from the image, the map generation unit 16 includes in the map the number of lanes included in the road and information on road markings formed on the lanes.

At this inclusion, the map generation unit 16 may determine, for each intersection area, the position of the intersection by referring to information indicating the geographical area represented in the target image for the map generation process and the position of the intersection area in the image, and associate positional information indicating the determined position (e.g., its latitude and longitude) with the road map. Similarly, the map generation unit 16 may divide each road into segments of a predetermined length, determine the positions of the segments by referring to information indicating the geographical area represented in the target image for the map generation process and the positions of the respective segments in the image, and associate positional information indicating the determined positions with the road map.

Additionally, the map generation unit 16 may connect road maps generated on an image-by-image basis to generate a road map of a larger area. To this end, the map generation unit 16 refers to information indicating the geographical areas represented in individual images to connect road maps obtained from the respective images so that the same position of the same road may agree.

The map generation unit 16 stores the generated road map in the memory 5 or writes it to the storage medium 8 via the storage medium access device 6. Alternatively, the map generation unit 16 may output the generated road map to another device via the communication interface 2.

Figure 6:
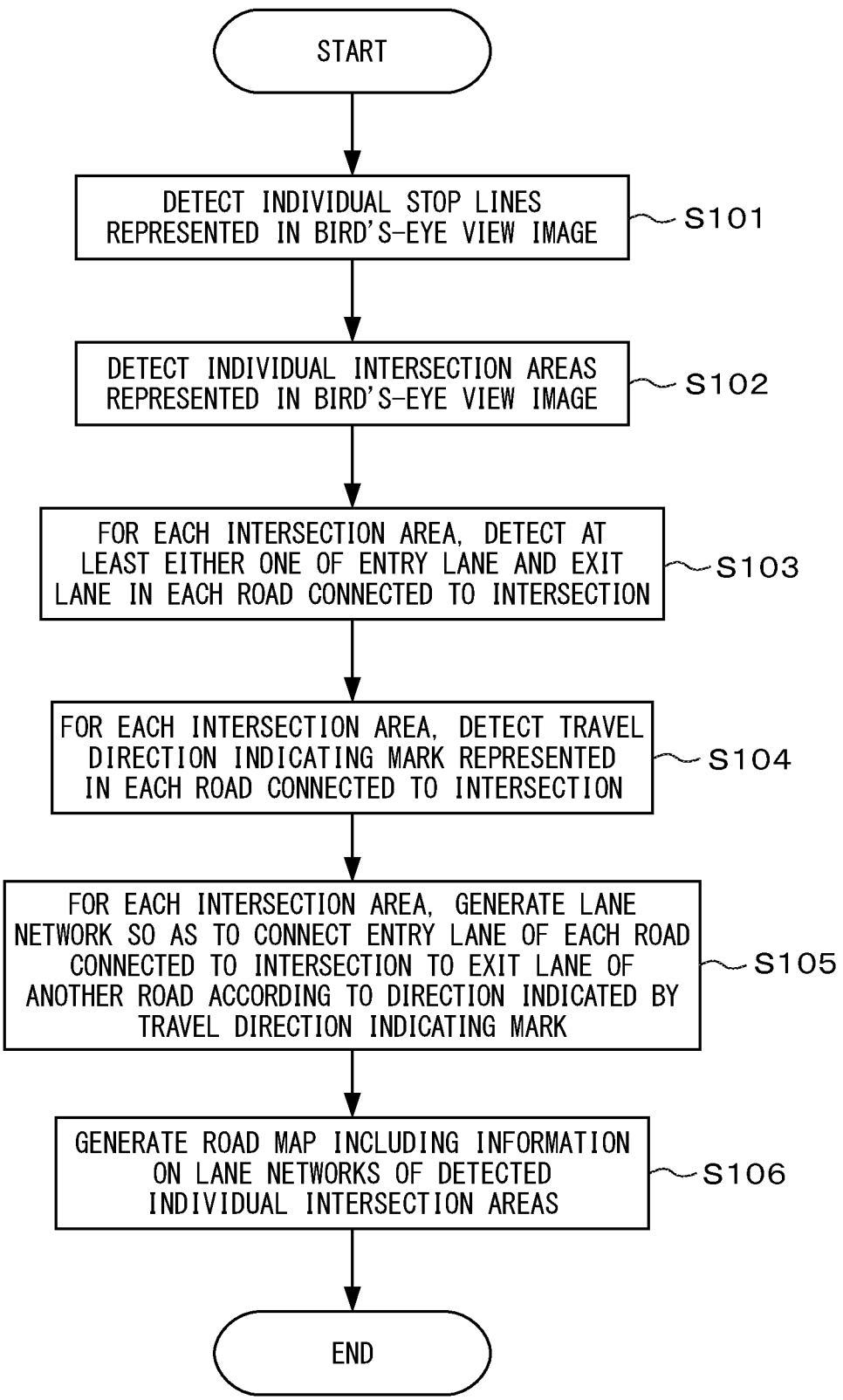
FIG. 6 is an operation flowchart of a map generation process.

FIG. 6 is an operation flowchart of the map generation process. The processor 7 executes the map generation process in accordance with the following operation flowchart for each bird's-eye view image that is a target for the map generation process.

The stop line detection unit 11 of the processor 7 detects individual stop lines represented in a bird's-eye view image (step S101). The intersection area detection unit 12 of the processor 7 detects individual intersection areas represented in the bird's-eye view image (step S102).

For each detected intersection area, the lane detection unit 13 of the processor 7 detects at least either one of an entry lane and an exit lane in each road connected to the intersection, based on the presence or absence of a stop line of the road and the ratio of the length of the stop line to the width of the road (step S103).

For each intersection area, the marking structure detection unit 14 of the processor 7 detects a travel direction indicating mark represented in each of the roads connected to the intersection included in the intersection area from the bird's-eye view image (step S104).

For each intersection area, the lane network generation unit 15 of the processor 7 generates a lane network so as to connect, for each of the roads connected to the intersection included in the intersection area, an entry lane of the road to an exit lane of another road to which vehicles are allowed to proceed from the entry lane, according to the direction indicated by the travel direction indicating mark on the entry lane of the road (step S105).

The map generation unit 16 of the processor 7 generates a road map including information representing the lane network of each intersection area (step S106). Then, the processor 7 terminates the map generation process.

As has been described above, the apparatus for generating a map detects individual intersection areas represented in a bird's-eye view image representing roads, and detects, for each detected intersection area, an entry lane and an exit lane in each road connected to the intersection. The apparatus then generates a lane network so as to connect, for each of the roads connected to the intersection, an entry lane of the road to an exit lane of another of the roads to which vehicles are allowed to proceed from the entry lane of the road. To this end, for each of the roads connected to the intersection, the apparatus detects from the bird's-eye view image a road marking represented in an entry lane of the road and indicating a direction in which vehicles are allowed to proceed, and identifies an exit lane of another road to which vehicles are allowed to proceed from the entry lane, according to the direction indicated by the road marking. In this way, the apparatus can automatically extract the connection relationship between travelable lanes of roads connected to an intersection, based on a bird's-eye view image.

Some intersections may have a lane where only a left turn (e.g., Japan) or a right turn (e.g., the US) is allowed although it does not have a road marking. For example, there is a road having a lane for turning left only that splits before an intersection from the other lanes subjected to traffic regulation by traffic lights and that is connected via a bypass route to an exit lane of the road lying on the left as viewed from the splitting road.

Thus, according to a modified example, the marking structure detection unit 14 may detect, for each of the roads connected to the intersection included in an individual intersection area, a road structure indicating a direction in which vehicles are allowed to proceed (hereafter, a "travel direction designating structure") from the bird's-eye view image, instead of or in addition to detecting a travel direction indicating mark. The travel direction designating structure may be a structure including a bypass route connecting an entry lane of one of the roads connected to an intersection to an exit lane of another of the roads, as described above.

For example, the marking structure detection unit 14 inputs the image into a classifier that has been trained to cut out predetermined areas respectively including individual intersection areas from an image to detect travel direction designating structures, thereby detecting a travel direction designating structure for each intersection area. As such a classifier, the marking structure detection unit 14 may use, for example, a CNN for object detection, such as SSD or Faster R-CNN. Alternatively, the marking structure detection unit 14 may detect travel direction designating structures in accordance with a technique other than machine learning, such as template matching of the predetermined areas with templates representing a travel direction designating structure and prestored in the memory 5.

The marking structure detection unit 14 passes information indicating an area including a travel direction designating structure detected in the image to the lane network generation unit 15.

Regarding an intersection area where a travel direction designating structure is detected, the lane network generation unit 15 identifies the road provided with the travel direction designating structure and the position of the travel direction designating structure relative to the road (i.e., on which side it lies, left or right, as viewed facing the intersection), based on the positional relationship between the travel direction designating structure and the roads connected to the intersection in the image. In general, a travel direction designating structure is provided so that vehicles can move from an entry lane to an exit lane without crossing an opposite lane. Thus, in a country having traffic laws stipulating that vehicles should keep left, e.g., in Japan, a travel direction designating structure is provided so as to split from a left turn lane at an intersection, i.e., the leftmost entry lane of a road as viewed facing the intersection and to merge with the rightmost exit lane of another road crossing the splitting road at the intersection as viewed facing the intersection. Conversely, in a country having traffic laws stipulating that vehicles should keep right, e.g., in the US, a travel direction designating structure is provided so as to split from a right turn lane at an intersection, i.e., the rightmost entry lane of a road as viewed facing the intersection and to merge with the leftmost exit lane of another road crossing the splitting road at the intersection as viewed facing the intersection. Thus, the lane network generation unit 15 may refer to information indicating the latitude and longitude of the geographical area represented in the image to identify the traffic laws applied to the geographical area (keeping left or right), thereby determining on which of a left turn lane or a right turn lane the travel direction designating structure is provided. Then, the lane network generation unit 15 may identify the position of the travel direction designating structure relative to the road, based on the result of determination.

Figure 7:
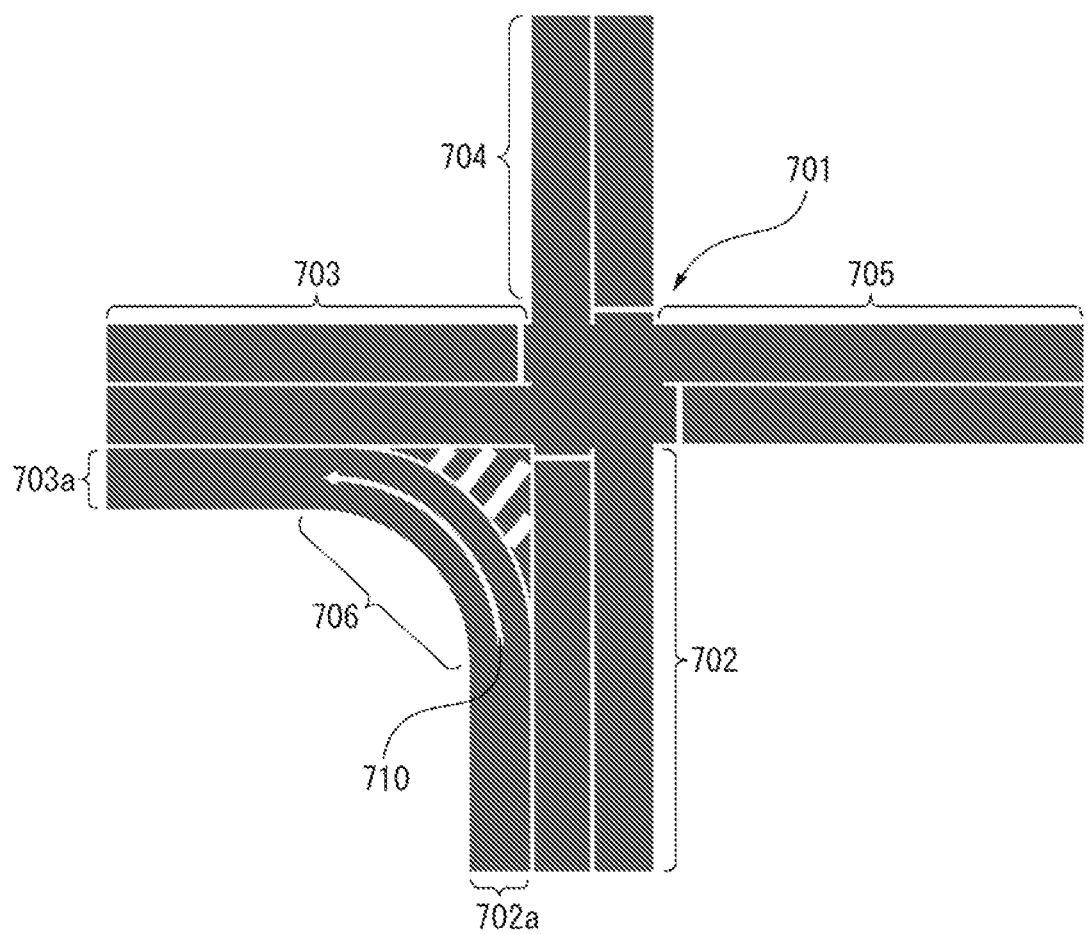
FIG. 7 illustrates an example of determination of the connection relationship between an entry lane and an exit lane based on a road structure.

FIG. 7 illustrates an example of determination of the connection relationship between an entry lane and an exit lane based on a road structure according to this modified example. As illustrated in FIG. 7, four roads 702 to 705 are connected to an intersection 701. Of these, between the leftmost entry lane 702a of the road 702 connected to the intersection 701 from the lower side and the exit lane 703a of the road 703 connected to the intersection 701 from the left side is provided a bypass route 706 that splits from the road 702 to the left, bypasses the intersection, and merges with the road 703. The bypass route 706 is an example of the travel direction designating structure. The marking structure detection unit 14 detects the bypass route 706 connecting the entry lane 702a directly to the exit lane 703a. The lane network generation unit 15 generates a lane network so as to connect the entry lane 702a of the road 702 and the exit lane 703a of the road 703 connected by the bypass route 706, as indicated by an arrow 710.

According to this modified example, the apparatus for generating a map can automatically extract the connection relationship between travelable lanes of roads connected to an intersection even if no road marking is detected.

A computer program for causing a computer to achieve the functions of the units included in the processor of the apparatus according to the embodiment or modified example may be provided in a form recorded on a computer-readable recording medium. The computer-readable recording medium may be, for example, a magnetic recording medium, an optical recording medium, or a semiconductor memory.

What is claimed is:

1. An apparatus for generating a map, comprising:
a processor configured to:
detect an intersection and roads connected to the intersection by inputting a bird's-eye view image into a first neural network trained to detect a road marking indicating a center of the intersection,
generate, based on a determination that the first neural network does not detect the road marking indicating the center of the intersection, a skeleton network including a line for each road detected by the first neural network, wherein the center of the intersection corresponds to an interaction of a first line included in the skeleton network and a second line included in the skeleton network,
detect, for each of the roads connected to the intersection detected by the first neural network, an entry lane for entering the intersection and an exit lane for exiting the intersection included in the road,
detect, for each of the roads, a road marking represented in the road or a road structure by inputting the bird's-eye view image into a second neural network separate from the first neural network and trained to detect the road marking or the road structure indicating a direction in which vehicles are allowed to proceed, and
generate, based on an output of the first neural network and the second neural network, a lane network representing a connection relationship between lanes in the intersection so as to connect, for each of the roads, an entry lane of the road to an exit lane of another of the roads to which vehicles are allowed to proceed from the entry lane of the road, based on the road marking marked on the entry lane of the road or the structure of the road.

2. The apparatus according to claim 1, wherein the processor detects, as the road marking, an arrow indicating a direction in which vehicles are allowed to proceed, and
the processor generates the lane network so as to connect, for each of the roads, an entry lane of the road only to an exit lane of another of the roads lying in the direction indicated by the arrow marked on the entry lane of the road.

3. The apparatus according to claim 1, wherein the processor detects, as the road structure, a bypass route connecting an entry lane of one of the roads directly to an exit lane of another of the roads, and
the processor generates the lane network so as to connect the entry lane and the exit lane connected by the bypass route.

4. The apparatus according to claim 1, wherein the processor is further configured to detect one or more stop lines in the intersection by inputting the bird's-eye view image into a third neural network separate from the first neural network and the second neural network and trained to detect stop lines.

5. A method for generating a map, comprising:
detecting an intersection and roads connected to the intersection by inputting a bird's-eye view image into a first neural network trained to detect a road marking indicating a center of the intersection;
generating, based on a determination that the first neural network does not detect the road marking indicating the center of the intersection, a skeleton network including a line for each road detected by the first neural network, wherein the center of the intersection corresponds to an interaction of a first line included in the skeleton network and a second line included in the skeleton network;
detecting, for each of the roads connected to the intersection detected by the first neural network, an entry lane for entering the intersection and an exit lane for exiting the intersection included in the road;
detecting, for each of the roads, a road marking represented in the road or a road structure by inputting the bird's-eye view image into a second neural network separate from the first neural network and trained to detect the road marking or the road structure indicating a direction in which vehicles are allowed to proceed; and
generating, based on an output of the first neural network and the second neural network, a lane network representing a connection relationship between lanes in the intersection so as to connect, for each of the roads, an entry lane of the road to an exit lane of another of the roads to which vehicles are allowed to proceed from the entry lane of the road, based on the road marking marked on the entry lane of the road or the structure of the road.

6. The method according to claim 5, further comprising:
detecting one or more stop lines in the intersection by inputting the bird's-eye view image into a third neural network separate from the first neural network and the second neural network and trained to detect stop lines.

7. A non-transitory computer readable medium that stores a computer program for generating a map, the computer program causing a computer to execute a process comprising:
detecting an intersection and roads connected to the intersection by inputting a bird's-eye view image into a first neural network trained to detect a road marking indicating a center of the intersection;
generating, based on a determination that the first neural network does not detect the road marking indicating the center of the intersection, a skeleton network including a line for each road detected by the first neural network, wherein the center of the intersection corresponds to an interaction of a first line included in the skeleton network and a second line included in the skeleton network;
detecting, for each of the roads connected to the intersection detected by the first neural network, an entry lane for entering the intersection and an exit lane for exiting the intersection included in the road;
detecting, for each of the roads, a road marking represented in the road or a road structure by inputting the bird's-eye view image into a second neural network separate from the first neural network and trained to detect the road marking or the road structure indicating a direction in which vehicles are allowed to proceed; and
generating, based on an output of the first neural network and the second neural network, a lane network representing a connection relationship between lanes in the intersection so as to connect, for each of the roads, an entry lane of the road to an exit lane of another of the roads to which vehicles are allowed to proceed from the entry lane of the road, based on the road marking marked on the entry lane of the road or the structure of the road.

8. The non-transitory computer readable medium according to claim 5, wherein the process further comprises:
    detecting one or more stop lines in the intersection by inputting the bird's-eye view image into a third neural network separate from the first neural network and the second neural network and trained to detect stop lines.

\* \* \* \* \*